(12) United States Patent
Kehoe et al.

(10) Patent No.: US 10,437,264 B2
(45) Date of Patent: Oct. 8, 2019

(54) SYSTEM AND METHOD FOR IMPROVING THE ACCURACY OF A RATE OF DECAY MEASUREMENT FOR REAL TIME CORRECTION IN A MASS FLOW CONTROLLER OR MASS FLOW METER BY USING A THERMAL MODEL TO MINIMIZE THERMALLY INDUCED ERROR IN THE ROD MEASUREMENT

(71) Applicant: Illinois Tool Works Inc., Glenview, IL (US)

(72) Inventors: Anthony Kehoe, Glenview, IL (US); Berwin Banares, Glenview, IL (US); Chris Ellec, Glenview, IL (US); John Lull, Glenview, IL (US); William Valentine, Glenview, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 512 days.

(21) Appl. No.: 14/378,584

(22) PCT Filed: Mar. 4, 2013

(86) PCT No.: PCT/US2013/028914
§ 371 (c)(1),
(2) Date: Aug. 13, 2014

(87) PCT Pub. No.: WO2013/134150
PCT Pub. Date: Sep. 12, 2013

(65) Prior Publication Data
US 2015/0234393 A1     Aug. 20, 2015

Related U.S. Application Data

(60) Provisional application No. 61/607,974, filed on Mar. 7, 2012.

(51) Int. Cl.
*G05D 7/06* (2006.01)
*G01F 25/00* (2006.01)
(Continued)

(52) U.S. Cl.
CPC .............. *G05D 7/06* (2013.01); *G01F 1/6847* (2013.01); *G01F 1/86* (2013.01); *G01F 15/005* (2013.01);
(Continued)

(58) Field of Classification Search
CPC .. G01F 25/0038; G01F 25/00; G01F 25/0053; G01F 1/6847; G01F 1/6965;
(Continued)

(56) References Cited

U.S. PATENT DOCUMENTS 5,479,812 A    1/1996   Juntunen et al.
6,845,659 B2 *  1/2005  Lull .................. G01F 1/6847
                                              73/204.15
(Continued)

FOREIGN PATENT DOCUMENTS

JP           6-119059         4/2017

OTHER PUBLICATIONS

International Search Report and Written Opinion dated May 3, 2013 for International PCT Application PCT/US2013/028914.

*Primary Examiner* — Matthew G Marini
*Assistant Examiner* — Leo T Hinze
(74) *Attorney, Agent, or Firm* — McGuireWoods LLP (57) ABSTRACT

The disclosed embodiments include a method, apparatus, and computer program product for improving the accuracy of a rate of decay measurement for real time correction in a mass flow controller or mass flow meter by using a thermal model to minimize thermally induced error in the rate of decay measurement.

20 Claims, 7 Drawing Sheets

(51) Int. Cl.
*G01F 1/684* (2006.01)
*G01F 1/86* (2006.01)
*G01F 15/00* (2006.01)

(52) U.S. Cl.
CPC .......... *G01F 25/00* (2013.01); *G01F 25/0007* (2013.01); *G01F 25/0053* (2013.01); *G05D 7/0635* (2013.01); *Y10T 137/0324* (2015.04); *Y10T 137/7722* (2015.04)

(58) Field of Classification Search
CPC ........... G01F 1/86; G01F 25/007; G05D 7/06; G05D 7/0635
See application file for complete search history.

(56) References Cited

U.S. PATENT DOCUMENTS

| | | | |
|---|---|---|---|
| 7,272,512 B2 | 9/2007 | Wang et al. | |
| 7,881,886 B1 | 2/2011 | Shareef et al. | |
| 7,905,139 B2* | 3/2011 | Lull | G01F 1/6847 73/202.5 |
| 2003/0234048 A1* | 12/2003 | Shajii | G01F 1/684 137/487.5 |
| 2006/0048568 A1 | 3/2006 | Korniyenko et al. | |
| 2008/0221822 A1 | 9/2008 | Laverdiere et al. | |
| 2010/0049461 A1* | 2/2010 | Lull | G01F 1/6847 702/100 |
| 2011/0011183 A1 | 1/2011 | Monkowski et al. | |
| 2011/0022334 A1* | 1/2011 | Ding | G01F 5/00 702/47 |

* cited by examiner

SYSTEM AND METHOD FOR IMPROVING THE ACCURACY OF A RATE OF DECAY MEASUREMENT FOR REAL TIME CORRECTION IN A MASS FLOW CONTROLLER OR MASS FLOW METER BY USING A THERMAL MODEL TO MINIMIZE THERMALLY INDUCED ERROR IN THE ROD MEASUREMENT

BACKGROUND OF THE INVENTION

1. Field of the Invention

The present invention relates generally to methods and systems for determining the mass flow rate of a fluid, and more particularly to the operation of mass flow controllers.

2. Discussion of the Related Art

Many industrial processes require precise control of various process fluids. For example, in the semiconductor industries, mass flow meters (MFMs) are used to precisely measure the amount of a process fluid that is introduced to a process chamber. In addition to measuring the mass flow, mass flow controllers (MFCs) are used to precisely measure and control the amount of a process fluid that is introduced to a process chamber. It is to be understood that the term fluid as used herein applies to any type of gas or vapor to which controlled flow may be of interest.

Rate of decay (ROD) measurements can be used to calibrate a variety of flow measurement devices including mass flow controllers and mass flow meters. However, current rate of decay measurements may include a thermally induced error.

The disclosed embodiments include a system and method for improving the accuracy of a rate of decay measurement for real time correction in a mass flow controller or mass flow meter by using a thermal model to minimize thermally induced error in the rate of decay measurement.

BRIEF SUMMARY OF THE INVENTION

The disclosed embodiments include a method, apparatus, and computer program product for improving the accuracy of a rate of decay measurement for real time correction in a mass flow controller (MFC) and/or a mass flow meter (MFM) by using a thermal model to minimize thermally induced error in the rate of decay measurement.

For example, in one embodiment, a mass flow controller is disclosed that includes an inlet for receiving the fluid and a flow path in which the fluid passes through the mass flow controller. The mass flow controller also includes a mass flow sensor for providing a signal corresponding to mass flow of the fluid through the flow path; an adjustable valve for regulating a flow of the fluid out of an outlet of the mass flow controller; and a controller configured to apply a valve control signal to adjust the adjustable valve to a desired valve position to control the flow of the fluid out of an outlet of the mass flow controller. Further, in accordance with the disclosed embodiments, the mass flow controller includes at least one processing component configured to execute instructions to improve the accuracy of a rate of decay measurement by using a thermal model to minimize thermally induced error in the rate of decay measurement.

In another embodiment, a method for improving a mass flow controller is disclosed. The method comprises, executing instructions, using a processor, to utilize a thermal model to minimize thermally induced error in a rate of decay measurement performed by the mass flow controller. The instructions include directions for determining a fit term (K1) using the thermal model and storing a baseline value for the fit term ($K1_{baseline}$), wherein the fit term (K1) is proportional to a mass flow that leaves the mass flow controller during the rate of decay measurement. The instructions also include for repeating the rate of decay measurement using the thermal model and computing a new value for the fit term ($K1_{remeasured}$); and calculating a percentage of accuracy shift using the equation ($K1_{remeasured} - K1_{baseline}$)/$K1_{baseline}$*100.

Each of the above described mass flow controller embodiments may similarly be configured in a mass flow meter (i.e., a device that measures mass flow rates, but does not include a controller that controls the rate of flow). Additional embodiments, advantages, and novel features are set forth in the detailed description.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The disclosed embodiments include a system and method for improving the accuracy of a rate of decay measurement for real time correction in a mass flow controller or mass flow meter by using a thermal model to minimize thermally induced error in the rate of decay measurement.

The disclosed embodiments and advantages thereof are best understood by referring to FIGS. 1-10 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Figure 1:
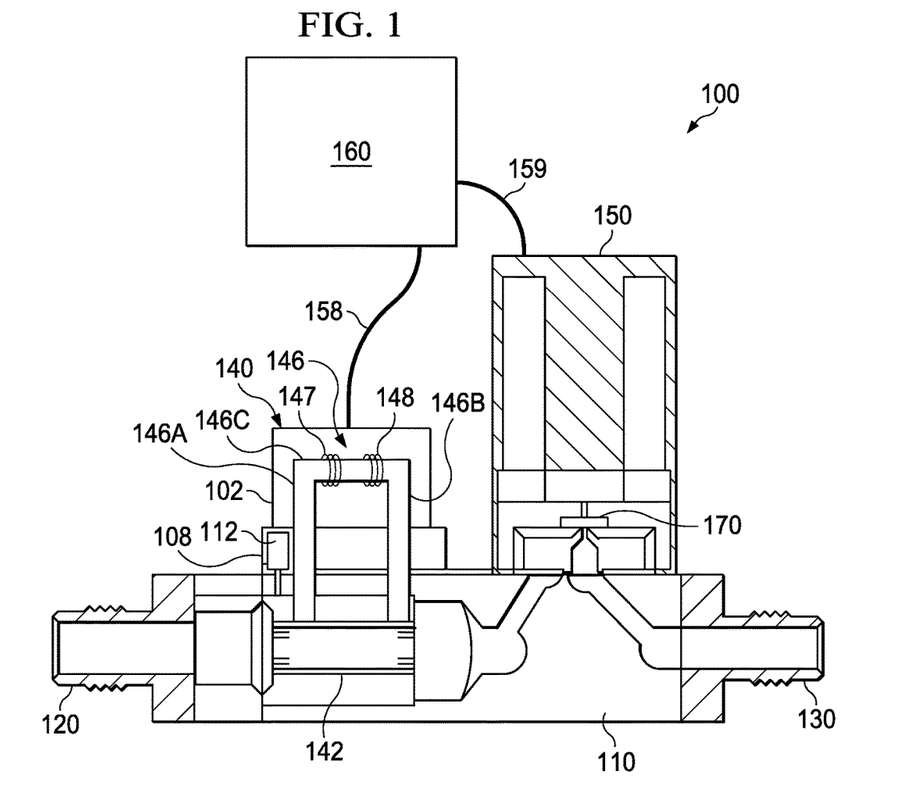
FIG. 1 illustrates components of a mass flow controller in accordance with the disclosed embodiments.

FIG. 1 shows schematically a typical mass flow controller 100 that includes a step 110, which is the platform on which the components of the mass flow controller are mounted. A thermal mass flow meter 140 and a valve assembly 150 containing a valve 170 are mounted on the step 110 between a fluid inlet 120 and a fluid outlet 130. The thermal mass flow meter 140 includes a bypass 142 through which typically a majority of fluid flows and a thermal flow sensor 146 through which a smaller portion of the fluid flows.

Thermal flow sensor 146 is contained within a sensor housing 102 (portion shown removed to show sensor 146) mounted on a mounting plate or base 108. Sensor 146 is a small diameter tube, typically referred to as a capillary tube, with a sensor inlet portion 146A, a sensor outlet portion 146B, and a sensor measuring portion 146C about which two resistive coils or windings 147, 148 are disposed. In operation, electrical current is provided to the two resistive windings 147, 148, which are in thermal contact with the sensor measuring portion 146C. The current in the resistive windings 147, 148 heats the fluid flowing in measuring portion 146 to a temperature above that of the fluid flowing through the bypass 142. The resistance of windings 147, 148 varies with temperature. As fluid flows through the sensor conduit, heat is carried from the upstream resistor 147 toward the downstream resistor 148, with the temperature difference being proportional to the mass flow rate through the sensor.

An electrical signal related to the fluid flow through the sensor is derived from the two resistive windings 147,148. The electrical signal may be derived in a number of different ways, such as from the difference in the resistance of the resistive windings or from a difference in the amount of energy provided to each resistive winding to maintain each winding at a particular temperature. Examples of various ways in which an electrical signal correlating to the flow rate of a fluid in a thermal mass flow meter may be determined are described, for example, in commonly owned U.S. Pat. No. 6,845,659, which is hereby incorporated by reference. The electrical signals derived from the resistive windings 147,148 after signal processing comprise a sensor output signal.

The sensor output signal is correlated to mass flow in the mass flow meter so that the fluid flow can be determined when the electrical signal is measured. The sensor output signal is typically first correlated to the flow in sensor 146, which is then correlated to the mass flow in the bypass 142, so that the total flow through the flow meter can be determined and the control valve 170 can be controlled accordingly. The correlation between the sensor output signal and the fluid flow is complex and depends on a number of operating conditions including fluid species, flow rate, inlet and/or outlet pressure, temperature, etc.

The process of correlating raw sensor output to fluid flow entails tuning and/or calibrating the mass flow controller and is an expensive, labor intensive procedure, often requiring one or more skilled operators and specialized equipment. For example, the mass flow sensor may be tuned by running known amounts of a known fluid through the sensor portion and adjusting certain signal processing parameters to provide a response that accurately represents fluid flow. For example, the output may be normalized, so that a specified voltage range, such as 0 V to 5 V of the sensor output, corresponds to a flow rate range from zero to the top of the range for the sensor. The output may also be linearized, so that a change in the sensor output corresponds linearly to a change in flow rate. For example, doubling of the fluid output will cause a doubling of the electrical output if the output is linearized. The dynamic response of the sensor is determined, that is, inaccurate effects of change in pressure or flow rate that occur when the flow or pressure changes are determined so that such effects can be compensated.

A bypass may then be mounted to the sensor, and the bypass is tuned with the known fluid to determine an appropriate relationship between fluid flowing in the mass flow sensor and the fluid flowing in the bypass at various known flow rates, so that the total flow through the flow meter can be determined from the sensor output signal. In some mass flow controllers, no bypass is used, and the entire flow passes through the sensor. The mass flow sensor portion and bypass may then be mated to the control valve and control electronics portions and then tuned again, under known conditions. The responses of the control electronics and the control valve are then characterized so that the overall response of the system to a change in set point or input pressure is known, and the response can be used to control the system to provide the desired response.

When the type of fluid used by an end-user differs from that used in tuning and/or calibration, or when the operating conditions, such as inlet and outlet pressure, temperature, range of flow rates, etc., used by the end-user differ from that used in tuning and/or calibration, the operation of the mass flow controller is generally degraded. For this reason, the flow meter can be tuned or calibrated using additional fluids (termed "surrogate fluids") and or operating conditions, with any changes necessary to provide a satisfactory response being stored in a lookup table. U.S. Pat. No. 7,272,512 to Wang et al., for "Flow Sensor Signal Conversion," which is owned by the assignee of the present invention and which is hereby incorporated by reference, describes a system in which the characteristics of different gases are used to adjust the response, rather than requiring a surrogate fluid to calibrate the device for each different process fluid used.

In addition, the mass flow controller 100 may include a pressure transducer 112 coupled to flow path at some point, typically, but not limited to, upstream of the bypass 142 to measure pressure in the flow path. Pressure transducer 112 provides a pressure signal indicative of the pressure. In accordance with the disclosed embodiments, the pressure transducer 112 is used to measure pressure during a rate of decay measurement.

Control electronics 160 control the position of the control valve 170 in accordance with a set point indicating the desired mass flow rate, and an electrical flow signal from the mass flow sensor indicative of the actual mass flow rate of the fluid flowing in the sensor conduit. Traditional feedback control methods such as proportional control, integral control, proportional-integral (PI) control, derivative control, proportional-derivative (PD) control, integral-derivative (ID) control, and proportional-integral-derivative (PID) control are then used to control the flow of fluid in the mass flow controller. A control signal (e.g., a control valve drive signal) is generated based upon an error signal that is the difference between a set point signal indicative of the desired mass flow rate of the fluid and a feedback signal that is related to the actual mass flow rate sensed by the mass flow sensor. The control valve is positioned in the main fluid flow path (typically downstream of the bypass and mass flow sensor) and can be controlled (e.g., opened or closed) to vary the mass flow rate of fluid flowing through the main fluid flow path, the control being provided by the mass flow controller.

In the illustrated example, the flow rate is supplied by electrical conductors 158 to a closed loop system controller 160 as a voltage signal. The signal is amplified, processed and supplied using electrical conductors 159 to the control valve assembly 150 to modify the flow. To this end, the controller 160 compares the signal from the mass flow sensor 140 to predetermined values and adjusts the proportional valve 170 accordingly to achieve the desired flow.

Although FIG. 1 depicts that the mass flow controller 100 includes a thermal mass flow sensor, the mass flow controller 100, in accordance with the disclosed embodiments, may utilize other types of mass flow sensors including a Coriolis type sensor. An advantage of using a Coriolis-based sensor is that it is capable of determining mass flow independent of temperature, flow profile, density, viscosity, and homogeneity.

As previously stated, rate of decay measurements can be used to calibrate a variety of flow measurement devices including the mass flow controller 100 illustrated in FIG. 1. The disclosed embodiments recognize that current rate of decay measurements may include a thermally induced error. Sections II-IV of this document describe the basis of the method that has been developed to eliminate or minimize thermally induced errors in rate of decay measurements.

Section II shows that the instantaneous tank discharge rate depends upon both the rate of pressure decay and the instantaneous rate of temperature change. Section III indicates that the internal tank temperature decays exponentially with time and that the final steady-state temperature of a constant fluid property gas is mainly dependent upon the tank discharge flow rate.

In Section IV, the tank gas temperature solution is substituted into the ideal gas law (with compressibility added) to develop a four term, empirical model that can be fitted to the recorded pressure decay trace. The second fitted term in the empirical model is indicative of the average tank discharge rate during the pressure decay. Any change in this second term in subsequent pressure decay traces at the same device setpoint indicates a change in the tank discharge flow rate.

II. Use of Temperature and Pressure to Calculate Tank Discharge Mass Flow Rate

The ideal gas law can be used to calculate the mass flow exiting a pressure chamber by taking the time derivatives of both sides as shown below:

$$PV = MRT_{tank} \quad \text{(Equation 1)}$$

$$d(PV)/dt = d(MRT_{tank})/dt \quad \text{(Equation 2)}$$

$$VdP/dt = RT_{tank}(dM/dt) + MR(dT_{tank}/dt) \quad \text{(Equation 3)}$$

$$dM/dt = [V/RT_{tank}](dP/dt) - [M/T_{tank}](dT_{tank}/dt) \quad \text{(Equation 4)}$$

where:

M=mass of gas contained within the internal discharge volume of the MFC, $T_{tank}$=average gas temperature of gas contained within the MFC (or tank) in absolute temperature units, dM/dt=mass flow rate, V=Internal Flow Volume, P=instantaneous pressure, dP/dt=derivative of pressure with respect to time, $dT_{tank}/dt$=derivative of tank averaged gas temperature with respect to time, and R=ideal gas constant.

As shown above in Equation 4, the presence of the temperature time derivative prevents a simple, direct relationship between the mass flow rate and the decaying pressure.

III. Analytical Thermal Model of a Tank Discharging at Constant Mass Flow Rate

The thermodynamics of a discharging tank causes the temperature of the gas within the tank to decrease as the gas leaves the tank. This temperature decrease arises from a simple energy balance; energy is required to push the gas out of the tank, and this energy must come from the internal energy of the gas itself. As the internal energy of a gas is directly related to its temperature via the constant volume specific heat (U=T*Cv), decreases in the internal energy equate to a decrease in the gas temperature.

The decrease in gas temperature will continue until at some point the heat flow into the gas from the surrounding environment (which is usually at a hotter ambient temperature) equals the energy necessary to expel the gas to the environment.

A differential equation which governs the internal energy of a control volume that has an entering and an exiting mass flow stream is as follows:

$$\frac{dE_{CV}}{dt} = \dot{Q} + \dot{W}_{net} + \left(u + \frac{V^2}{2} + gz + P\upsilon\right)_{in} M_{in} - \left(u + \frac{V^2}{2} + gz + P\upsilon\right)_{out} M_{out} \quad \text{(Equation 5)}$$

where:

$\frac{dE_{CV}}{dt}$ = rate of change of internal in the tank, $\dot{Q}$=heat transfer from environment into the tank, $\dot{W}_{net}$=net work into the tank, u=internal energy of streams entering/exiting tank, gz=gravitational energy of streams entering/exiting tank, P=Pressure of fluid in streams entering/exiting tank, $\upsilon$=Specific volume of fluid in stream entering/exiting tank, and $M_{in}/M_{out}$=Mass Flow entering/leaving tank Several simplifications can be made when applying Equation 5 to a discharging tank:

1. The inflow terms can be ignored.
2. As this is a rigid tank, the $\dot{W}_{net}$ term can be ignored.
3. If the velocity in the outlet stream is low and if the tank centerline is close to the centerline of the exiting stream, then the velocity and gravitational terms in the exiting stream can be neglected.
4. The remaining internal energy term (u) and the $P\upsilon$ term can be combined into an enthalpy term, i.e., h=u+P$\upsilon$.

Applying the above simplifications results in:

$$\frac{dE_{CV}}{dt} = \dot{Q} + h_{out} M_{out} \quad \text{(Equation 6)}$$

Applying the following additional simplifications to Equation 6:

1. Via the Ideal Gas Law, the $$\frac{dE_{CV}}{dt}$$

term can be replaced with $T_{tank} C_v M(t)$ where $T_{tank}$ is the instantaneous average gas temperature within the tank (or MFC), $C_v$ is the constant volume specific heat of the gas, M(t) refers to the instantaneous mass within the tank.

2. Via the Ideal Gas Law, the enthalpy term on the RHS of Equation 6 can be replaced with $T_{tank} C_p$ where $C_p$ is the constant pressure specific heat of the gas.

results in the following differential equation:

$$C_v T_{tank} \frac{dM}{dt} + C_v M \frac{dT_{tank}}{dt} = \dot{Q} + M_{out} C_p T_{tank} \quad \text{(Equation 7)}$$

Equation 7 can be further reduced with the following additional simplifications:

1.
$$\frac{dM}{dt} = -M_{out}$$
$$R = C_p - C_v$$

2.
3. $M = M_i - t M_{out}$ where $M_i$ is the initial mass within the tank, and t is time expired since the start of the tank discharge.
4.
$$\dot{Q} = hA_s(T_{env} - T_{tank}) = \frac{Nu\, k}{Dia} A_s (T_{env} - T_{tank})$$

where $A_s$ is the internal surface area of the MFC that is in contact with the discharging gas, h is the convective heat transfer coefficient, Nu is the Nusselt Number for constant temperature heat transfer in fully developed pipe flow, k is the gas thermal conductivity, Dia is the pipe equivalent hydraulic diameter of the MFC's internal storage volume, and Tenv is the temperature of the environment (metal temperature) surrounding the gas.

which results in the following differential equation:

$$\frac{dT_{tank}}{dt} = \quad \text{(Equation 8)}$$
$$\left(\frac{1}{C_v(M_i - tM_{out})}\right)\left[\frac{Nu\, k}{Dia} A_s T_{env} - T_{tank}\left(\frac{NukA_s}{Dia} + RM_{out}\right)\right]$$

If the mass that leaves the tank during the discharge ($tM_{out}$) is small relative to the mass present at the start of the discharge ($M_i$), then the discharge term in the denominator of the first term on the RHS of Equation 8 can be neglected. This small discharge approximation results in the following solution to Equation 8:

$$T_{tank} = \quad \text{(Equation 9)}$$
$$\frac{\frac{NukA_s}{Dia} T_{env}}{\frac{NukA_s}{Dia} + RM_{out}} + \left[\frac{RM_{out}}{\left(\frac{NukA_s}{Dia} + RM_{out}\right)}\right] \exp^{-t\left(\frac{\frac{NukA_s}{Dia} + RM_{out}}{MiC_v}\right)}$$

Examination of Equation 9 shows that for constant fluid properties and a fixed geometry, the final gas temperature is strictly a function of the rate at which mass exits the gas chamber.

An assumption frequently made in rate of decay applications is to assume that the temperature inside the decay chamber is constant during the decay. This means that the second term in Equation 4 is ignored, and that the mass flow exiting the chamber can be calculated by simply multiplying the pressure derivative by a constant.

Rearrangement of Equation 4 results in:

$$\frac{dP}{dt} = \frac{R}{V}\left(T_{tank}\frac{dM}{dt} + M\frac{dT_{tank}}{dt}\right) \quad \text{(Equation 4a)}$$

Examination of Equations 4, 4a, and 9 indicate the following:

1. For a given flow rate, the tank gas temperature will experience an exponential temperature decay until the final steady-state temperature is reached (Equation 9).

2. The measured pressure decay trace will include a component attributable to the mass discharge and the exponential temperature decay (Equation 4a).

3. As both transient terms in Equation 4a are of the same sign, equating the measured pressure decay directly to the tank discharge mass flow rate (i.e., ignoring the temperature decay term in Equation 4) will result in an over estimate of the tank discharge mass flow rate.

The disclosed embodiments recognize that the temperature induced error could be reduced to zero if the instantaneous bulk fluid average temperature could be measured accurately. However, it is difficult to measure bulk fluid average temperatures without numerous temperature sensors. In addition, these sensors would have to be at least one, if not two, order(s) of magnitude faster than the time transient of interest, and they would have to have very little thermal inertia. As decay time constants on the order of 0.5 seconds have been measured, this means that sensors with time constants below 0.05 seconds would have to be used. As the heat flow into the gas from the surrounding environment has been estimated to be on the order of 0.02 to 2.0 Watts, the thermal sensor must absorb very little heat.

IV. Extraction of the Tank Discharge Mass Flow Rate from a Pressure Decay Trace Via an Empirical Model To overcome the above problems, the disclosed embodiments provide an alternative approach based upon an appropriate empirical model.

As shown in Equation 9, the temperature solution for a tank undergoing a constant flow discharge into a lower pressure stream is of the form:

$$T_{tank}(t) = T_f + A^* \exp(-t/\tau) \quad \text{(Equation 10)}$$

where:

$T_{tank}(t)$=Instantaneous, time dependent temperature,

A=Amplitude of the temperature exponential decay $T_f$=Final steady-state temperature of the gas in the tank, $\tau$=gas dependent thermal time constant.

Substitution of Equation 10 into Equation 1 results in:

$$P = \frac{RM(t)}{V}(Ae^{-t/\tau} + T_f) \quad \text{(Equation 11)}$$

Where, M(t) is the mass of the gas contained within the internal volume of the MFC with respect to time.

In order to have on-line, real time rate of decay verifications of device accuracy, the MFC must maintain the same flow rate during the decay. Thus, M(t) can be estimated by:

$$M(t) = M_i - tQ_{ref}\rho_{ref} \quad \text{(Equation 12)}$$

$$= M_i - \rho_{ref} \int_0^t Q_{ref}\, dt$$

where:

$\rho_{ref}$=the gas standard density (the density of an equivalent ideal gas at standard temperature and pressure) in accordance with SEMI Specification E12-96, and $Q_{ref}$=the gas volumetric flow rate at standard density (the density of an equivalent ideal gas at standard temperature and pressure) in accordance with SEMI Specification E12-96 and all other variables have been previously defined.

In an ideal situation, the MFC controller will maintain exactly the same flow rate during the decay. However, the reality is that there will be some minor flow perturbations during the decay. Therefore, the rightmost expression of Equation 12 is preferred.

Insertion of the right most expression from Equation 12 into 11 results in:

$$P(t) = \frac{RM_i T_f}{V} - \frac{RT_f}{V}\rho_{ref}\int_0^t Q_{ref}\, dt + \quad \text{(Equation 13)}$$
$$\frac{RM_i}{V}Ae^{-t/\tau} - \frac{R\,A}{V}\rho_{ref}\int_0^t e^{-t/\tau} Q_{ref}\, dt$$

It is well known that the ideal gas law, which was used in the derivation of Equation 13, is not appropriate for all MFC gases. A more appropriate formulation is to use the non ideal gas law with the compressibility factor applied, i.e., $$PV = ZMRT_{tank} \quad \text{(Equation 14)}$$

where:

Z=Gas Compressibility Factor and all other variables have been previously defined.

In a manner similar to that use to derive Equation 13, Equations 10 and 12 can be substituted into Equation 14 to obtain:

$$P(t) = Z\frac{RM_i T_f}{V} - Z\frac{RT_f}{V}\rho_{ref}\int_0^t Q_{ref}\, dt + \quad \text{(Eq. 15)}$$
$$Z\frac{RM_i}{V}Ae^{-t/\tau} - Z\frac{R\,A}{V}\rho_{ref}\int_0^t e^{-t/\tau} Q_{ref}\, dt$$

If both sides of Equation 15 are divided by the compressibility factor and the temperature, a new variable is introduced (Mg=P/[Z T]=pressure normalized with respect to temperature and compressibility as taught in commonly owned U.S. Pat. No. 7,905,139, entitled "Mass Flow Controller With Improved Dynamic," which is hereby incorporated by reference). The resultant expression is:

$$Mg(t) = \frac{RM_i T_f}{V\,T_{tank}} - \frac{RT_f}{V\,T_{tank}}\rho_{ref}\int_0^t Q_{ref}\, dt + \quad \text{(Eq. 16)}$$
$$\frac{RM_i}{V\,T_{tank}}Ae^{-t/\tau} - \frac{R\,A}{V\,T_{tank}}\rho_{ref}\int_0^t e^{-t/\tau} Q_{ref}\, dt$$

It should be noted that the variable Mg, as defined by Equation 16 is influenced by both the tank gas temperature and the mass flow that is leaving the tank.

Even with inclusion of gas compressibility, Equation 16 is still contains several significant approximations relative to the true physics of the problem. The most notable approximations are:

1. The $T_{tank}$ term in the denominator of the RHS of Equation 16 refers to the bulk average gas temperature. However, most MFC temperature sensors measure temperature at point(s) exterior to the flow field. Because the temperature sensors are relatively slow, the measured or sensed temperature ($T_{tank}$) remains essentially constant during the decay. Thus the formulation described by Equation 16 only accounts for direct temperature impacts through the exponential term.

2. As mentioned above, Equation 16 uses a bulk average temperature, i.e., the analysis assumes that the gas is contained within one contiguous volume and temperature variations within this single volume are minimal. The reality is that the internal discharge volumes of most MFCs are not contiguous and there is probably a several degree temperature variation within the multiple internal volumes.

3. It should be noted that in Equation 16, the compressibility factor, which is a function of both temperature and pressure, is continuously updated with respect to pressure during the decay (the Mg term). However, because of the relatively slow temperature sensing noted above, the compressibility factor is not updated with respect to temperature.

While Equation 16 contains significant approximations, it does suggest a functional curve fit that can be used to extract the MFC flow rate during an rate of decay measurement:

$$Mg(t) = K0 - K1\int_0^t Q_{ref}\, dt + K2e^{-t/\tau} + K3\int_0^t e^{-t/\tau} Q_{ref}\, dt \quad \text{(Equation 17)}$$

where:

K0=Fit term equal to the normalized pressure at the start of the decay minus the exponential normalized pressure decay term, i.e., K0=Mg(0)−K2, K1=Fit term proportional to the mass flow that leaves the MFC during pressure decay, K2=Fit term equal to the amplitude of the normalized pressure decay (which is caused by the exponential temperature decay), K3=fit term attributable to mass that leaves the MFC during the exponential pressure decay, and τ=system gas thermal time constant. This is a gas specific value and can either be measured or obtained through calculation for a specific MFC gas.

The two key terms in Equation 17 are the K1 and K2 terms. The K1 term is a units conversion term that depends on the final steady state temperature. If the decay volume is designed appropriately (e.g., small diameter volume with large surface area to volume ratio), then K1 should be nearly constant at all flow rates. In such a situation, K1 is essentially a constant (or calibration factor) and any deviation from an original measured value indicates a change (or error shift) in the measured flow rate. Even when K1 is not constant, it can be measured as a function of flow rate for a given gas. Any significant deviation in subsequent measurements of K1 as a function of flow rate would indicate a significant change in flow rate.

The K2 term is related to the temperature and can be used to estimate the temperature drop from the following equation:

$$A = \frac{K2\, T_{tank,initial}^2}{P_{start}} * C \quad \text{(Equation 18)}$$

where:

A=the steady state temperature difference between the discharging gas and the environment in °K (or the amplitude of the exponential decay), $T_{tank,initial}$=the gas temperature at the start of the decay in °K, $P_{start}$=the Inlet Pressure at the start of the decay in psia, K2=the measured curve fit coefficient at each flow rate and inlet pressure, and C=appropriate units conversion constant.

In actual practice, it has been found that inclusion of the K3 term does not significantly improve the resultant curve fit—especially with respect to the K1 term. Therefore, this term is seldom used.

The functional fit defined by Equation 17 is essentially a "tau model". That is, once tau is known for a given gas and set of operating conditions (tau obtained either through experiment or simple calculation), then the problem of fitting Equation 17 to the measured normalized pressure decay trace becomes a linear least squares problem which can be very easily handled by the mass flow controller's firmware.

There are several ways to utilize the tau model to determine a change in a device's performance over time. The most direct way is to baseline K1 at a variety of setpoints when the device is first installed at the customer site. The process of obtaining these initial K1 values is called commissioning. These baseline K1 values are then stored in the device and at various points later in time the "tau model" of Equation 17 is refit to newer decay data to obtain current K1 values.

Any change in these later K values, when compared to the "baseline" values, correlates directly with a change in device accuracy. That is, a 1% increase in K1 would correspond to a 1% increase in flow rate.

V. Results

Figure 2:
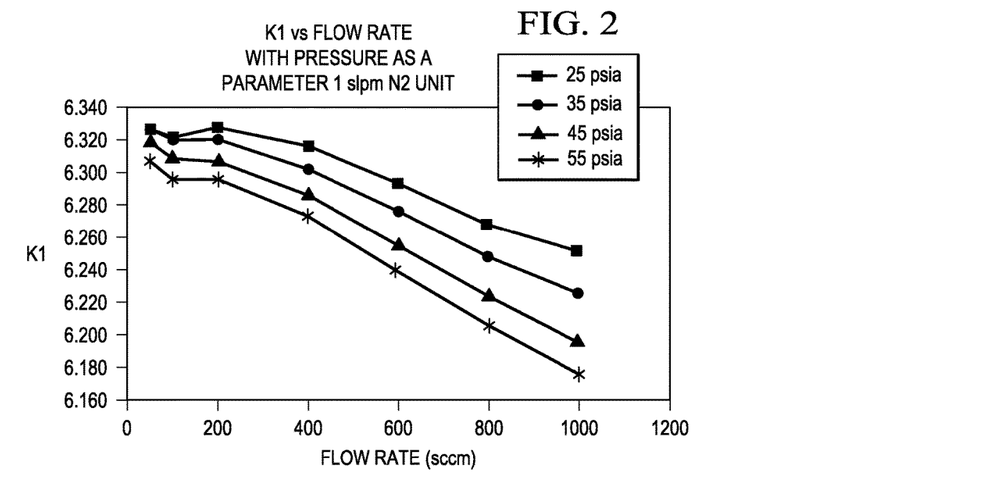
FIG. 2 is a plot of K1 vs. Flow Rate for a 1 slpm N2 unit.
Figure 3:
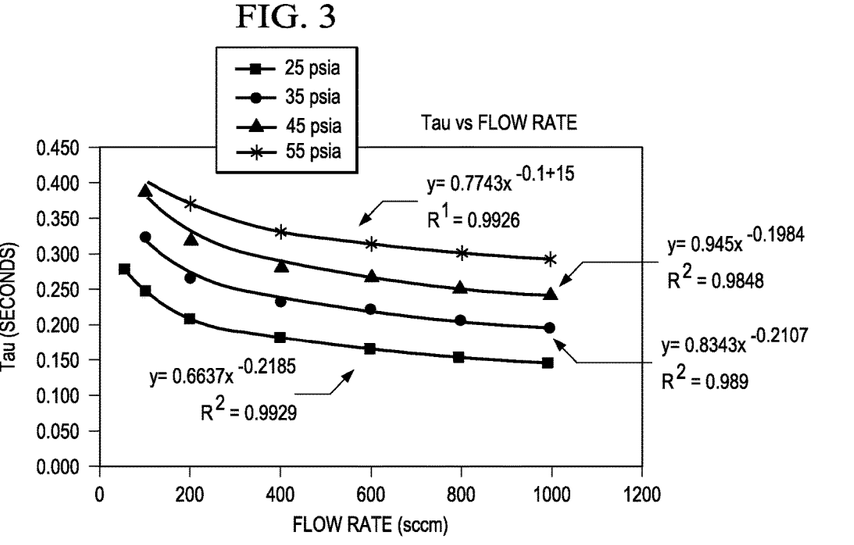
FIG. 3 is a plot of Tau vs. Flow Rate for a 1 slpm N2 unit.
Figure 4:
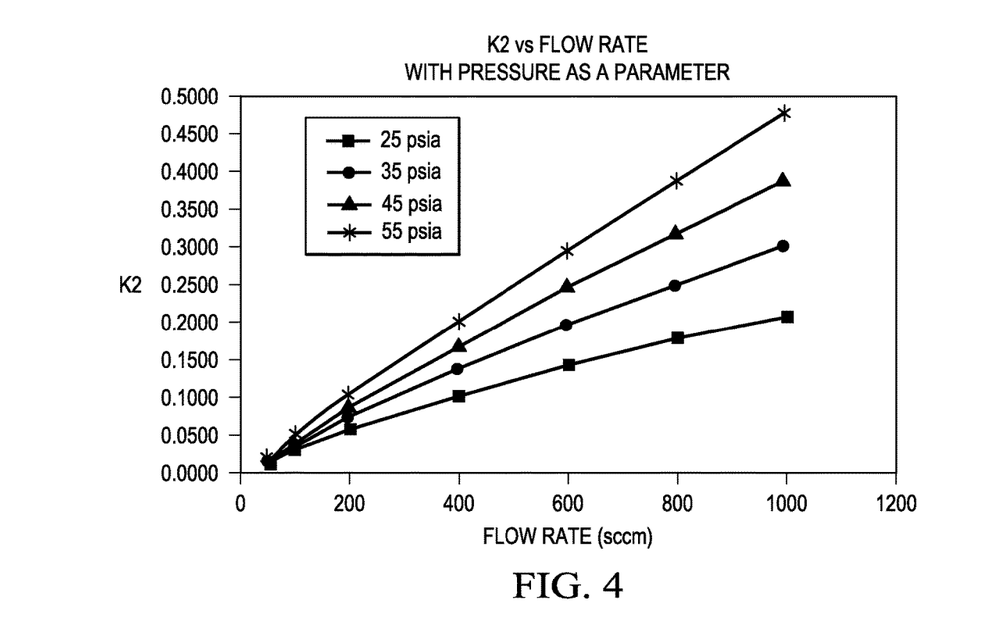
FIG. 4 is a plot of K2 vs. Flow Rate for a 1 slpm N2 unit.
Figure 5:
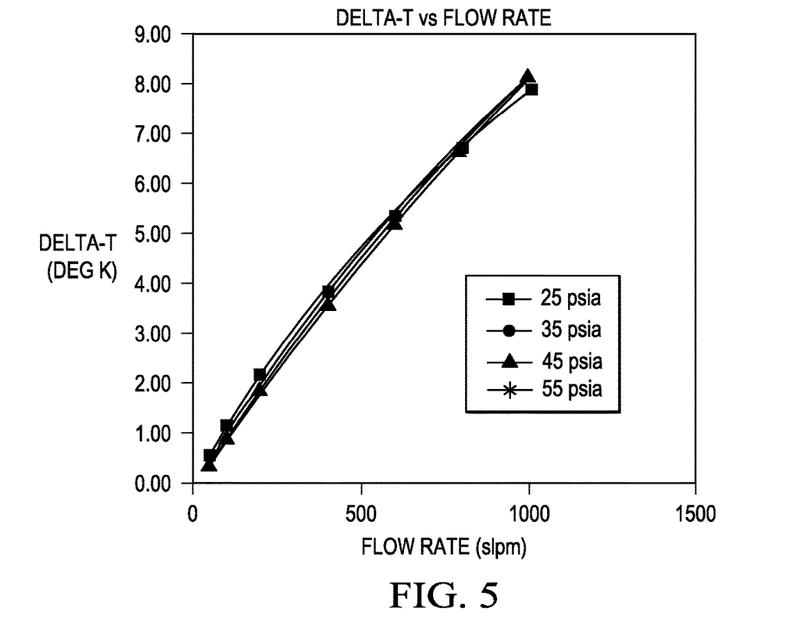
FIG. 5 is a plot of the gas temperature drop as a function of flow rate.

FIGS. 2-5 illustrate the results of applying the tau model to pressure decay data from a 1 slpm N2 mass flow controller. FIGS. 2, 3, and 4 show the corresponding K1, tau, and K2 values respectively. FIG. 5 shows the estimated temperature drop obtained from the K2 data via Equation 18.

As shown in FIG. 2, there is a small dependency of K1 with pressure. This pressure dependency is about 0.25% over a 30 psi change in inlet pressure at very low flow rates (K1 varies from 6.305 to 6.326). At 1 slpm, K1 varies by about 1% over a 30 psi change in inlet pressure (K1 goes from 6.18 to 6.25). This pressure dependency is the result of the fully developed laminar flow assumption used for the heat transfer coefficient in the derivation of Equation 8 and the small mass discharge approximation used to derive Equation 9.

Both K1 and the final gas temperature decrease with increasing flow rate (the increase in Delta-t with flow rate [FIG. 5] means that the gas temperature has decreased). Examination of Equation 16 shows the presence of a $T_f/T_{tank}$ coefficient in the second term (which is K1). As previously mentioned, MFC temperature sensors are typically very slow and highly unlikely to measure the decrease in the gas temperature during the pressure decay. Thus, as $T_f$ continues to decrease with increasing mass flow rate (Equation 9) and the measured gas temperature, $T_{tank}$, remains essentially constant, the K1 term will decrease with increasing flow rate.

Figure 6:
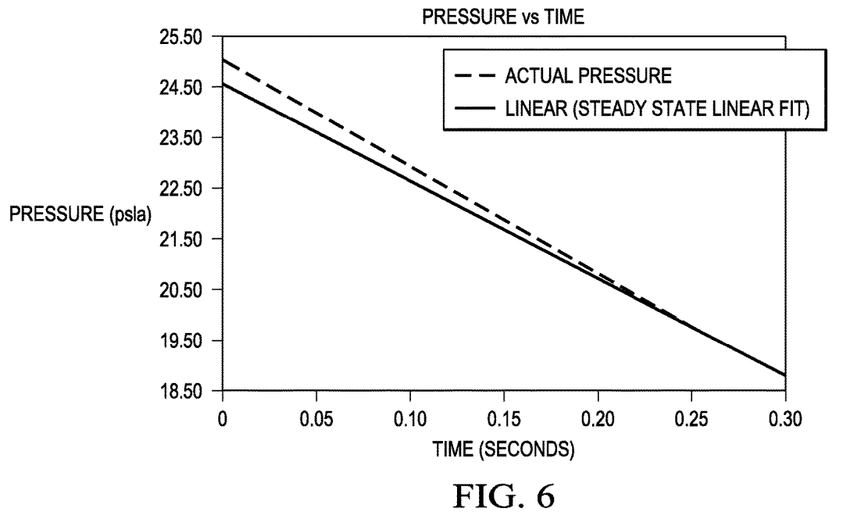
FIG. 6 is a plot of the pressure decay during a 0.3 second time interval for a 1 slpm N2 MFC.

FIG. 6 depicts an actual pressure decay trace for the 100% SP of the 1 slpm N2 device as well as a linear fit to the steady-state part of the decay. There is about a 15% change in the slope of the pressure from the early (exponential) part of the pressure decay (t<100 milliseconds) to the steady state part (t>300 milliseconds) of the pressure decay. Thus, not accounting for the exponential part of the pressure decay in rate of decay measurements can induce a significant amount of measurement error.

Figure 7:
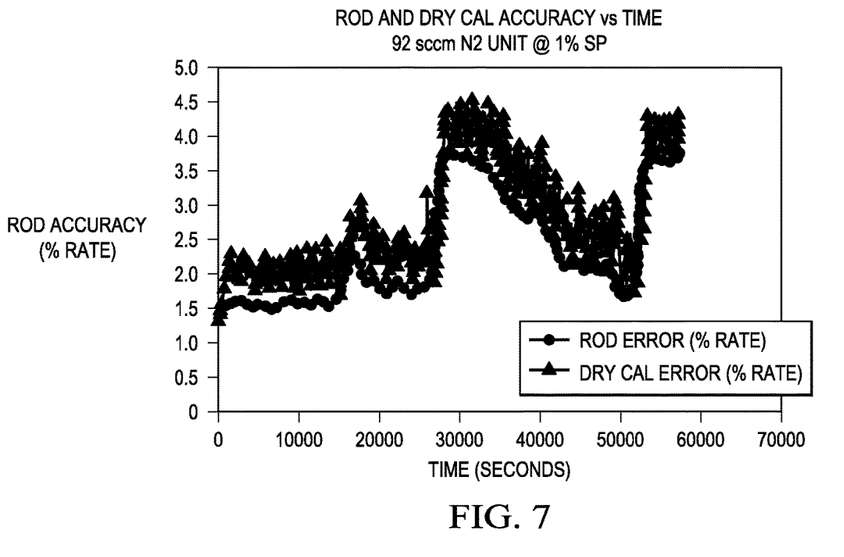
FIG. 7 is a plot of simultaneous ROD and Dry Cal Accuracies over time for a 92 sccm N2 unit.

FIG. 7 depicts the device accuracy of a 92 sccm N2 MFC operating at 1% SP with the ROD methodology described in this document. Also shown in FIG. 7 are Dry Cal accuracy measurements that were simultaneously recorded while the ROD accuracy measurements were being obtained. This simultaneous measurement is accomplished by sending the gas output of the MFC to the Dry Cal, giving the MFC a 1% SP, and then turning on the ROD measurement process.

As referred to above, Dry Cal is a method of measuring flow rate by determining how fast a piston inside a glass cylinder will rise when flow is input to the bottom of the gas cylinder. As flow enters the cylinder, the piston starts to lift off from its base. The piston passes an optical switch as it rises and starts a timer. When the piston passes a second optical switch, which is higher up on the glass cylinder, the timer is stopped. As the volume between the two optical switches is known (determined by the Dry Cal manufacturer), then flow rate is computed by dividing the volume by the time obtained from the timer. Thus, if it takes the piston 1 minute to traverse a 10 cm^3 volume, then the actual flow rate is 10 cm^3/min.

In the depicted example, the device that was used to generate the data in FIG. 7 was known to have a bad sensor that drifted over time. Examination of the data in FIG. 7 shows that the rate of decay measurements agreed very well with the simultaneous Dry Cal measurements; agreement was typically within several tenths of a percent of reading over a period of time in excess of twelve hours.

Figure 8:
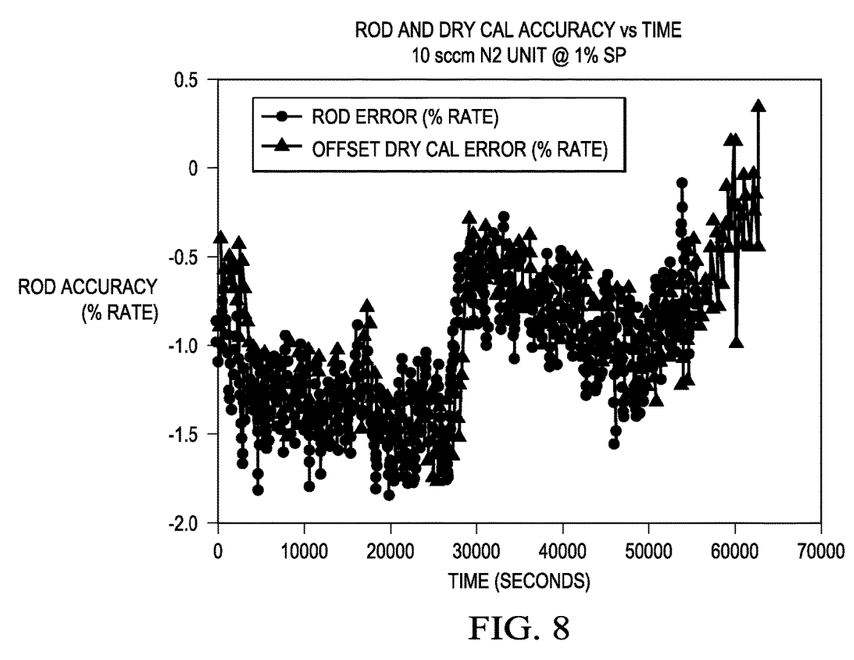
FIG. 8 is a plot of simultaneous ROD and Dry Cal Accuracies over time for a 10 sccm N2 unit.

FIG. 8 depicts the rate of decay and Dry Cal accuracy measurements of a 10 sccm N2 MFC operating at 1% SP. As with the device used in FIG. 7, this device was known to have a bad sensor that drifted over time. As with the results shown in FIG. 7, the rate of decay and Dry Cal measurements in FIG. 8 agree to with each other to within several tenths of a percent over period of time in excess of 12 hours.

Figure 9:
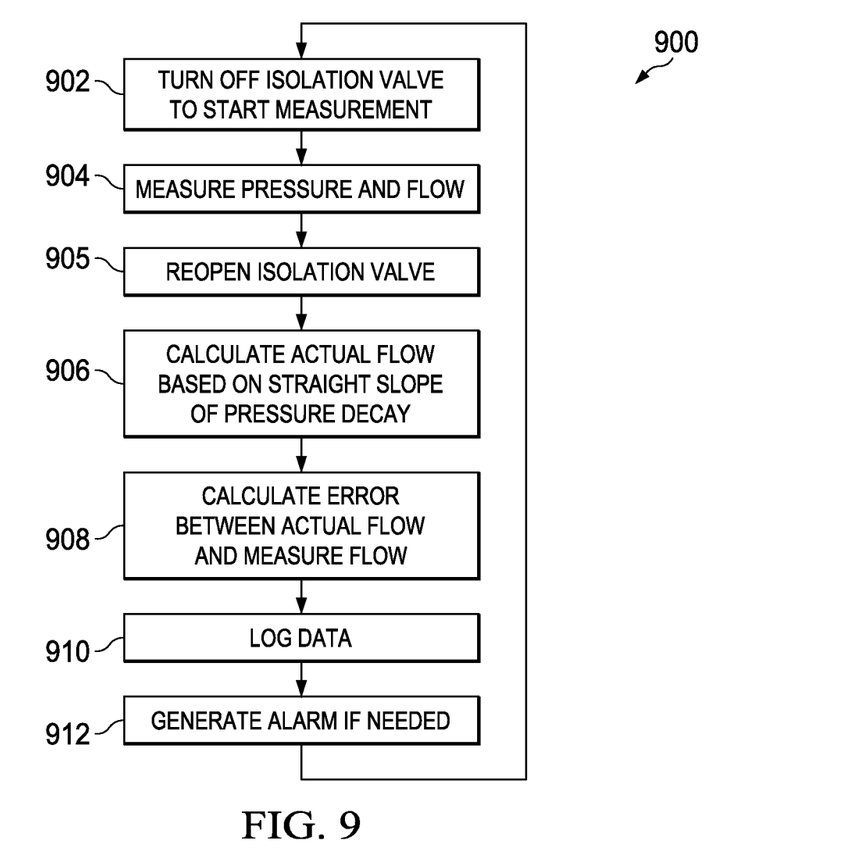
FIG. 9 is a flow diagram illustrating the basic decay model (i.e., ideal case)
Figure 10:
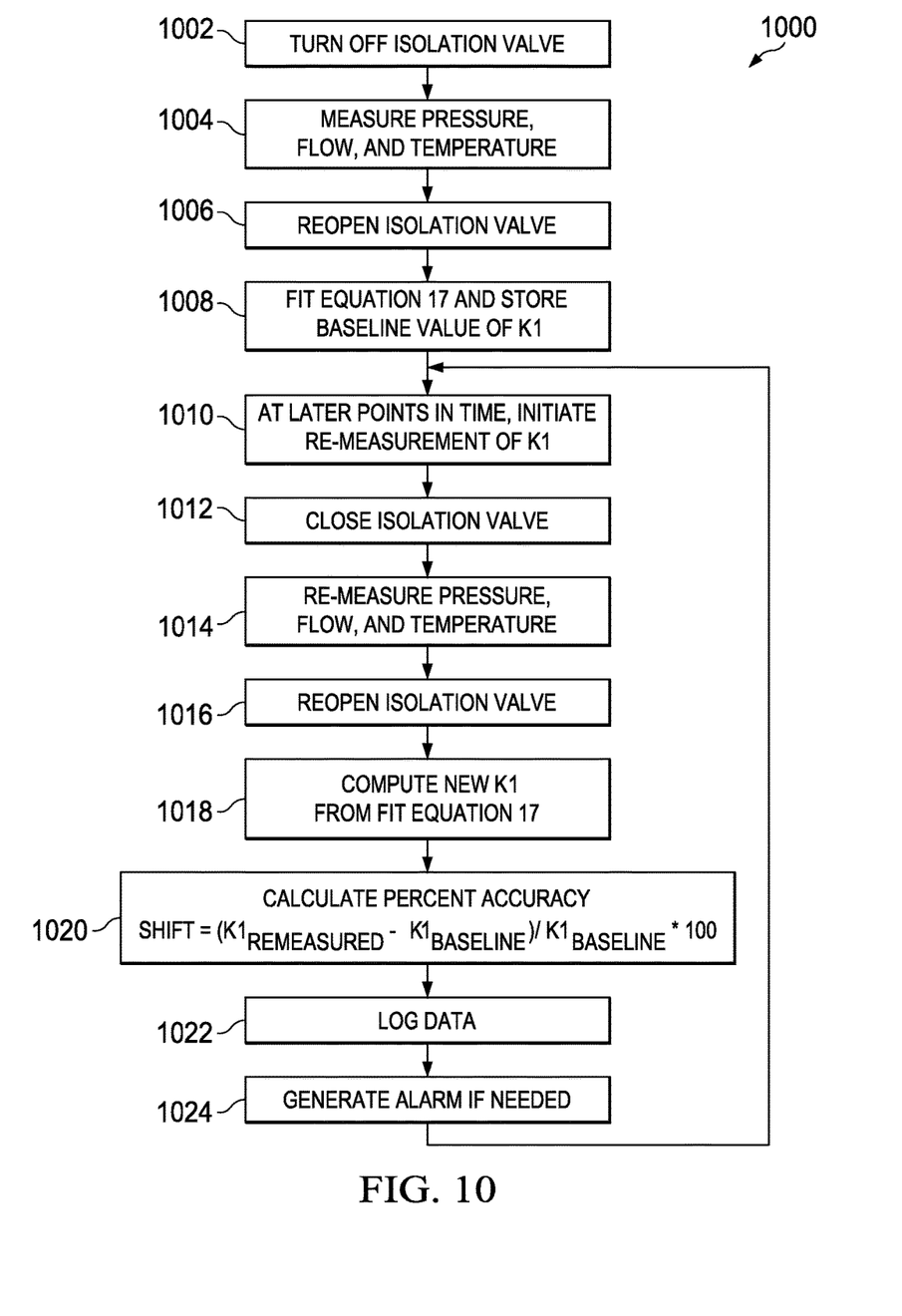
FIG. 10 is a flow diagram illustrating an example of a thermal decay model that accounts for the temperature changes during pressure decay in accordance with the disclosed embodiments.

FIGS. 9 and 10 depict the differences between the basic decay model (i.e., ideal case) (process 900) and a thermal decay model (process 1000) that accounts for the temperature changes during pressure decay in accordance with the disclosed embodiments.

As illustrated in FIG. 9, the process 900 depicts a basic rate of decay measurement in accordance with the ideal gas law and does not account for temperature changes during pressure decay. For instance, to initiate the rate of decay measurement, the process at step 902 shuts off the isolation valve to stop the flow of gas to the mass flow controller. At step 904, the process performs a pressure and flow measurement. The process reopens the isolation valve at step 905 following the rate of decay measurement. The process at step 906 calculates a flow based on a straight slope of pressure decay and determines any error between the calculated flow and the measured flow at step 908. Process logs the data at step 910 and generates an alarm, if needed, at step 912, with process 900 terminating thereafter.

In contrast to process 900, process 1000, in accordance with the disclosed embodiments, performs a rate of decay measurement that accounts for the temperature changes during pressure decay. Thus, process 1000 improves the accuracy of the rate of decay measurement by minimizing thermally induced error in the rate of decay measurement. Process 1000 begins at step 1002 by closing the isolation valve to initiate the rate of decay measurement. At step 1004, the process performs a pressure, flow, and temperature measurement. The process reopens the isolation valve at step 1006 following the rate of decay measurement. At step 1008, the process uses a functional curve fit (e.g., equation 17) to determine the value of a fit term (K1) that is proportional to the mass flow that leaves the MFC during pressure decay. The process stores the value of K1 as a baseline value. At various points later in time as determined by the operator (step 1010), the process will repeat the rate of decay measurement process (steps 1012-1016) and compute a new K1 value from the functional curve fit equation. In certain embodiments, the process may require a minimum wait time between measurements depending upon flow rate and gas type. For example, in one embodiment, the general minimum wait time is approximately 15 seconds. Thus, once the baseline value of K1 has been measured, the process can re-measure K1 as often as every 15 seconds as determined by the operator. At step 1020, the process calculates the percentage of accuracy shift, which equals $(K1_{remeasured} - K1_{baseline})/K1_{baseline}*100$. The process at step 1022 logs the data and performs trending analysis. The process generates an alarm signal if it determines that the trending information indicates that the accuracy has shifted beyond a predefined threshold. For example, if the accuracy at a given setpoint has shifted by more than 2% over a 2 week period, then an alarm may be generated. The process returns to step 1010 and repeats the rate of decay measurement cycle at various points later in time.

Further, in certain embodiments, the mass flow controller may be configured to self-correct its calibration and offset based on the results of the rate of decay measurements described above.

Accordingly, as described above, advantages of the disclosed embodiments include, but are not limited to, providing a system and method for improving the accuracy of a rate of decay measurement for real time correction in a mass flow controller by using a thermal model to minimize thermally induced error in the rate of decay measurement.

While the above described figures discloses various embodiments of a mass flow controller, one of ordinary skill in the art would recognize that the above disclosed modifications may similarly be made to a mass flow meter for improving the accuracy of a rate of decay measurement for real time correction in the mass flow meter by using a thermal model to minimize thermally induced error in the rate of decay measurement. The primary difference between the disclosed mass flow controller and a mass flow meter is that the mass flow meter does not include a controller that operates to adjust the valve to achieve a desired flow rate as is the case with a mass flow controller. The scope of the appended claims is intended to cover mass flow meters as well as mass flow controllers and any other similar flow measuring/controlling devices.

While specific details about the above embodiments have been described, the above hardware and software descriptions are intended merely as example embodiments and are not intended to limit the structure or implementation of the disclosed embodiments.

In addition, as outlined above, certain aspects of the disclosed embodiments may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming Those skilled in the art will recognize that the present teachings are amenable to a variety of modifications and/or enhancements. While the foregoing has described what is considered to be the best mode and/or other examples, it is understood that various modifications may be made therein and that the subject matter disclosed herein may be implemented in various forms and examples, and that the teachings may be applied in numerous applications, only some of which have been described herein. Such modifications are intended to be covered within the true scope of the present teachings.

In addition, the flowcharts, sequence diagrams, and block diagrams in the figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated. The scope of the claims is intended to broadly cover the disclosed embodiments and any such modification.

The invention claimed is:

1. A mass flow controller comprising:
an inlet for receiving a fluid;
a flow path in which the fluid passes through the mass flow controller;
a mass flow sensor for providing a signal corresponding to mass flow of the fluid through the flow path;
a pressure transducer coupled to the flow path configured to measure fluid pressure at a point in the flow path;
an adjustable valve for regulating a flow of the fluid out of an outlet of the mass flow controller;
a controller configured to apply a valve control signal to adjust the adjustable valve to a desired valve position to control the flow of the fluid out of an outlet of the mass flow controller; and
at least one processing component configured to execute instructions to calculate a rate of decay measurement based on multiple pressure, flow and temperature measurements, and based at least in part on a thermal model of pressure normalized with respect to temperature and compressibility and to cause the controller to correct the valve control signal for real time correction of controlling the flow of fluid;
wherein the thermal model accounts for temperature changes during pressure decay of the fluid pressure;
wherein the thermal model accounts for temperature changes by estimating steady state temperature differences between discharging fluid and environment.

2. The mass flow controller of claim 1, further comprising a temperature sensor for determining a temperature along the flow path.

3. The mass flow controller of claim 1, wherein the pressure transducer is configured to provide a signal corresponding to the fluid pressure of the fluid at the point in the flow path.

4. The mass flow controller of claim 1, wherein the mass flow sensor is a thermal mass flow sensor that includes a flow sensor.

5. The mass flow controller of claim 1, wherein the instructions to calculate the rate of decay measurement based at least in part on the thermal model include instructions for determining a fit term (K1) using the thermal model, wherein the fit term (K1) is proportional to a mass flow that leaves the mass flow controller during the rate of decay measurement.

6. The mass flow controller of claim 5, wherein the instructions to calculate the rate of decay measurement based at least in part on the thermal model further include instructions for storing a baseline value for the fit term ($K1_{baseline}$).

7. The mass flow controller of claim 6, wherein the instructions to calculate the rate of decay measurement based at least in part on the thermal model further include instructions for repeating the rate of decay measurement using the thermal model and computing a new value for the fit term ($K1_{remeasured}$).

8. The mass flow controller of claim 7, wherein the instructions to calculate the rate of decay measurement based at least in part on the thermal model further include instructions to calculate a percentage of accuracy shift, which equals ($K1_{remeasured} - K1_{baseline}$)/$K1_{baseline}$*100.

9. The mass flow controller of claim 1, wherein the at least one processing component is configured to execute instructions to log results of the rate of decay measurement and perform trending analysis based on the logged results.

10. The mass flow controller of claim 9, wherein the at least one processing component is configured to execute instructions to generate an alarm based on the trending analysis indicating that the accuracy has shifted beyond a predefined threshold.

11. The mass flow controller of claim 10, wherein the at least one processing component is configured to execute instructions to self-correct its calibration and offset based on results of the rate of decay measurements.

12. The mass flow controller of claim 1, wherein the thermal model is represented by the equation:

$$Mg(t) = K0 - K1 \int_0^t Q_{ref} \, dt + K2 e^{-t/\tau} + K3 \int_0^t e^{-t/\tau} Q_{ref} \, dt.$$

13. A method for controlling at least one of a mass flow controller and a mass flow meter, the method comprising:
receiving a signal from a mass flow sensor corresponding to mass flow of a fluid through a flow path of at least one of the mass flow controller and the mass flow meter;
receiving a fluid pressure measurement at a point in the flow path from a pressure transducer coupled to the flow path;
executing instructions, using a processor, to utilize a thermal model of pressure normalized with respect to temperature and compressibility at least in part to calculate a rate of decay measurement performed by at least one of the mass flow controller and the mass flow meter based on multiple pressure, flow and temperature measurements, wherein the thermal model accounts for temperature changes during pressure decay of the fluid pressure by estimating steady state temperature differences between discharging fluid and environment; and
applying a valve control signal to adjust an adjustable valve of the mass flow controller to a desired valve position to control a flow of the fluid out of an outlet of the mass flow controller based at least in part on results of the rate of decay measurement pressure for real time correction of controlling the flow of the fluid.

14. The method of claim 13, wherein executing instructions, using the processor, to utilize the thermal model to calculate the rate of decay measurement include instructions for determining a fit term (K1) using the thermal model, wherein the fit term (K1) is proportional to a mass flow that leaves at least one of the mass flow controller and the mass flow meter during the rate of decay measurement.

15. The method of claim 14, wherein the instructions to utilize the thermal model to calculate the rate of decay measurement further include instructions for storing a baseline value for the fit term ($K1_{baseline}$).

16. The method of claim 15, wherein the instructions to utilize the thermal model to calculate the rate of decay measurement further include instructions for repeating the rate of decay measurement using the thermal model and computing a new value for the fit term ($K1_{remeasured}$).

17. The method of claim 16, wherein the instructions to utilize the thermal model to calculate the rate of decay measurement further include instructions to calculate a percentage of accuracy shift, which equals ($K1_{remeasured} - K1_{baseline}$)/$K1_{baseline}$*100.

18. The method of claim 13, further comprising executing instructions to log results of the rate of decay measurement and perform trending analysis based on the logged results.

19. The method of claim 18, further comprising executing instructions to generate an alarm based on the trending analysis indicating that the accuracy has shifted beyond a predefined threshold.

20. The method of claim 13, wherein the thermal model is represented by the equation:

$$Mg(t) = K0 - K1\int_0^t Q_{ref}\, dt + K2e^{-t/\tau} + K3\int_0^t e^{-t/\tau} Q_{ref}\, dt.$$

* * * * *